(12) United States Patent
Witte

(10) Patent No.: US 7,384,539 B2
(45) Date of Patent: Jun. 10, 2008

(54) OPTIMIZED PREHEATING OF HYDROGEN/HYDROCARBON FEED STREAMS

(75) Inventor: Gregory M. Witte, Florissant, MO (US)

(73) Assignee: ConocoPhillips Company, Houston, TX (US)

( * ) Notice: Subject to any disclaimer, the term of this patent is extended or adjusted under 35 U.S.C. 154(b) by 604 days.

(21) Appl. No.: 10/900,756

(22) Filed: Jul. 28, 2004

(65) Prior Publication Data

US 2006/0021908 A1    Feb. 2, 2006

(51) Int. Cl.
*F28F 1/10* (2006.01)
*F28D 7/06* (2006.01)
*C10G 47/00* (2006.01)
*C10G 9/14* (2006.01)

(52) U.S. Cl. .............. 208/107; 165/176; 165/172; 208/132

(58) Field of Classification Search ............. 165/164, 165/172, 176, DIG. 120, DIG. 122, DIG. 413, 165/DIG. 104.12, 140; 422/200, 201; 208/107, 208/132, 169
See application file for complete search history.

(56) References Cited

U.S. PATENT DOCUMENTS

| 3,475,322 | A | 10/1969 | Carson |
| 5,039,396 | A | 8/1991 | Steinberg |
| 5,267,434 | A | 12/1993 | Termuehlen et al. |
| 5,324,452 | A | * 6/1994 | Allam et al. ................. 252/373 |
| 5,893,411 | A | * 4/1999 | Nir ............................. 165/140 |
| 6,161,613 | A | 12/2000 | Huenniger |
| 6,516,873 | B1 | 2/2003 | Haugen |
| 6,589,415 | B2 | * 7/2003 | Smith et al. .................. 208/59 |
| 6,668,914 | B2 | 12/2003 | Längl |
| 2004/0045870 | A1 | 3/2004 | Wristberg et al. |

OTHER PUBLICATIONS

Robert H. Perry et al., *Heat-Transfer Equipment in Perry's Chemical Engineers' Handbook*, title page and p. 11-36, (7th ed., 1997).

* cited by examiner

*Primary Examiner*—Walter D. Griffin
*Assistant Examiner*—Frank C. Campanell
(74) *Attorney, Agent, or Firm*—Jeffrey R. Anderson; Kameron D. Kelly

(57) ABSTRACT

An improved and simplified hydrocarbon processing system is provided which has a mixing section for mixing of hydrogen and hydrocarbon to form combined, two-phase streams, as well as an indirect heat exchange section having a plurality of double-pass shell-and-tube heat exchangers designed to simultaneously receive and heat respective combined streams while maintaining separation of the streams. The use of the specialized double-pass exchangers results in significantly reduced capital and maintenance costs.

21 Claims, 3 Drawing Sheets

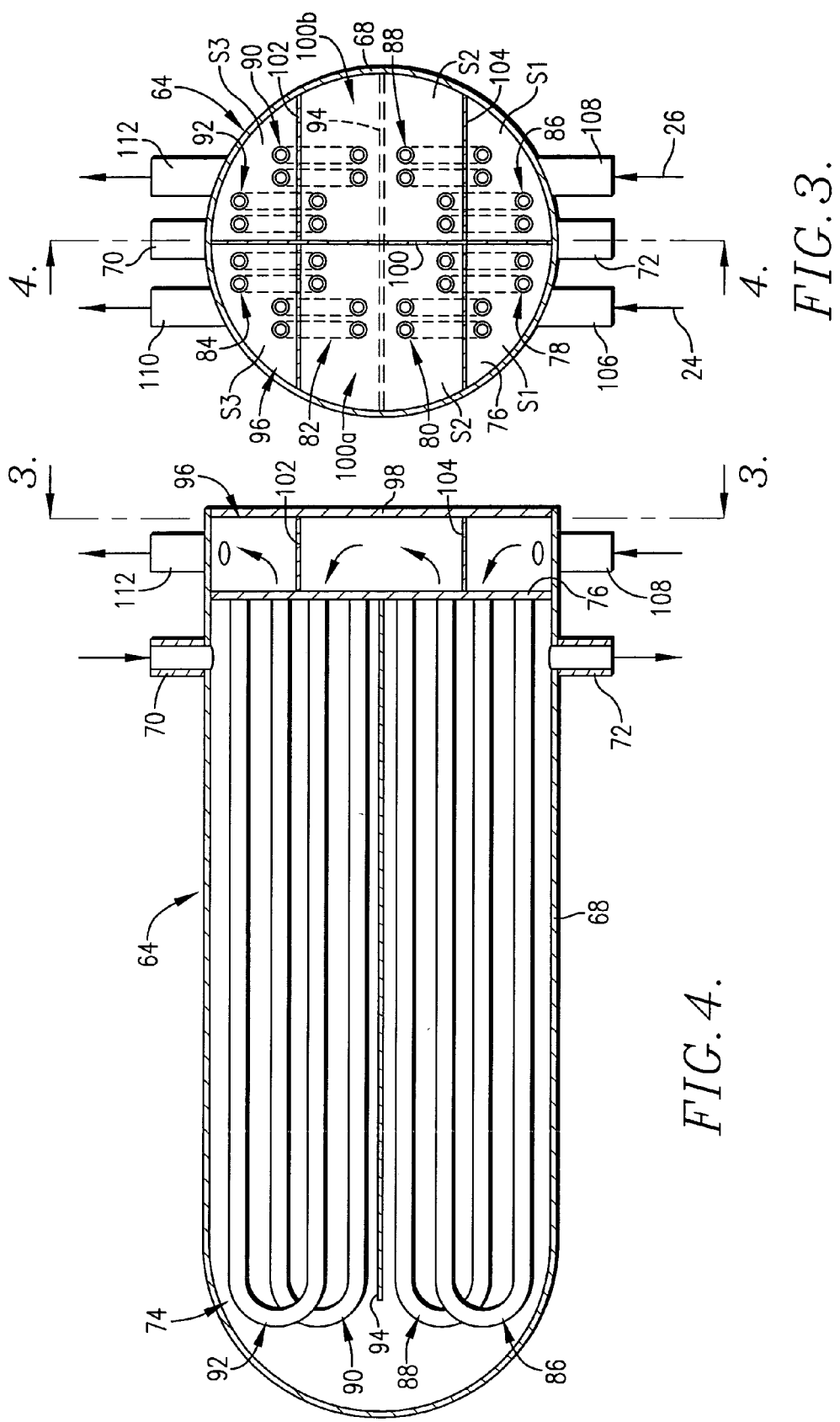

US 7,384,539 B2

OPTIMIZED PREHEATING OF HYDROGEN/HYDROCARBON FEED STREAMS

The present invention is broadly concerned with improved hydrocarbon processing methods which make use of multiple-pass heat exchangers for preheating of process streams, thereby minimizing capital and maintenance costs attendant to the methods. More particularly, the invention pertains to processing methods wherein multiple hydrogen/hydrocarbon streams are passed through a single indirect heat exchanger while maintaining stream separation, and making use of a downstream reactor effluent stream as a source of heat in the indirect heat exchanger.

BACKGROUND OF THE INVENTION

Conventional hydroprocessing units such as distillate, gas oil, and residue hydrotreaters and hydrocrackers preheat hydrogen and oil streams in a series of heat exchangers using reactor effluent as the heating medium. In most cases, the hydrogen and oil streams have been preheated in separate heat exchangers, with downstream control valves employed to properly distribute these single phase streams to multiple passes of a downstream furnace. In other cases, it has been known to premix hydrocarbon and hydrogen to form combined streams which are then passed through heat exchangers. However, these processing schemes require substantial capital investment owing to the need for the multiple heat exchangers and associated piping, valves, and control components. By the same token, maintenance costs are also high.

SUMMARY OF THE INVENTION

It is, therefore, an object of the present invention to provide improve hydrocarbon processing methods and equipment which significantly lower capital and maintenance costs, as compared with conventional equipment and methods.

A further object of the invention is to provide such methods and equipment wherein use is made of one or more specially designed indirect heat exchangers which simultaneously receive two liquid/gaseous combined streams to be processed, while maintaining the streams separate from each other during heating.

It is yet another object of the invention to provide an improved indirect heat exchanger for simultaneous heating of separate streams which includes a tube assembly including U-tube pairs with divider walls in the header thereof serving to maintain the separation of individual streams passing therethrough.

One aspect of the present invention concerns a hydrocarbon processing method comprising (a) simultaneously heating at least two separate hydrocarbon-containing streams in a first side of an indirect heat exchanger while maintaining separation of the hydrocarbon-containing streams in the heat exchanger; (b) subjecting the resulting heated streams to chemical reaction in a reactor; and (c) passing a hot effluent stream from the reactor through a second side of the heat exchanger to facilitate the heating of step (a).

Another aspect of the present invention concerns a hydroprocessing unit comprising a shell-and-tube heat exchanger and a reactor. The heat exchanger defines a shell-side flow path configured to receive a shell-side fluid and at least two separate tube-side flow paths configured to receive and maintain separation of at least two tube-side fluids. The reactor defines an inlet configured to receive the tube-side fluids from the tube-side flow paths and an outlet configured to discharge a reactor effluent. The shell-side flow path is fluidly coupled to the reactor outlet so that the reactor effluent can be employed as the shell-side fluid in the heat exchanger.

Still another aspect of the present invention concerns a shell-and-tube heat exchanger for facilitating simultaneous indirect heat transfer between a shell-side fluid stream and at least two separate tube-side fluid streams. The heat exchanger comprises a shell, a header, and a plurality of U-tubes coupled to the header and at least partly disposed in the shell. The header and the U-tubes cooperatively define at least two separate tube-side flow paths configured to receive and maintain separation of the tube-side fluid streams.

BRIEF DESCRIPTION OF THE DRAWINGS

FIG. 3 is an end view of one of the preferred multiple-pass heat exchangers used in the invention.

FIG. 4 is a vertical sectional view of the preferred shell-and-tube heat exchanger, taken along line 4-4 of FIG. 3, and further depicting the construction of the heat exchanger.

DETAILED DESCRIPTION OF THE PREFERRED EMBODIMENT

The apparatus and methods of the present invention will be described with reference to the drawings. Reference to these specific configurations of the drawings is not meant to limit the invention to the details of the drawings disclosed in conjunction therewith.

Known Hydrocarbon Processing Methods

Figure 1:
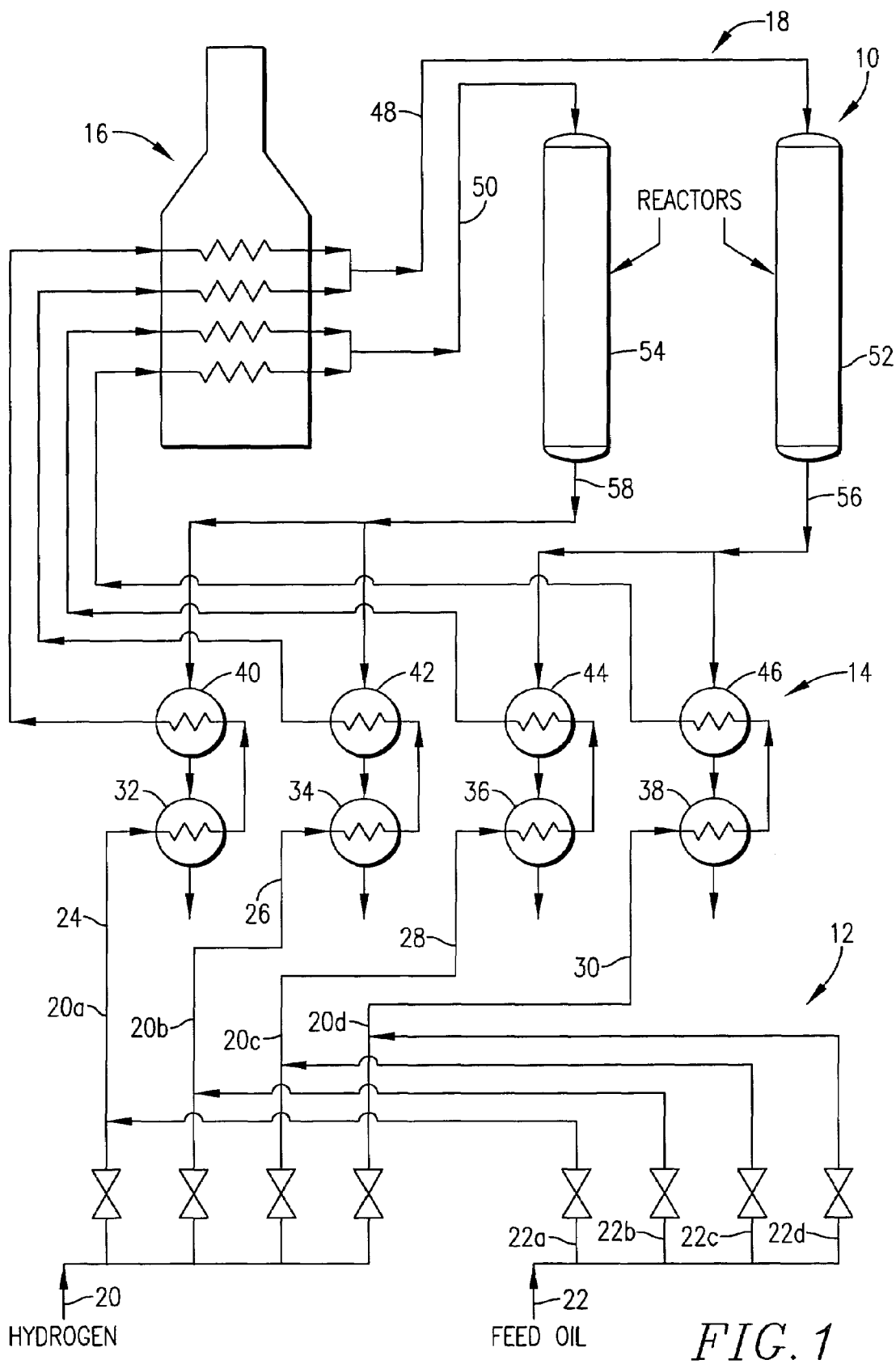
FIG. 1 is a schematic flow diagram of a conventional hydrocarbon processing plant illustrating the use of a large number of single-pass indirect heat exchangers for preheating of combined hydrogen/hydrocarbon feed streams.

Referring to FIG. 1, a hydrocarbon processing system 10 is illustrated which broadly includes a hydrogen/hydrocarbon mixing section 12, heat exchanger section 14, furnace 16, and reactor section 18. In the illustrated arrangement, the reactors are hydrocrackers for the cracking of high molecular weight hydrocarbons.

In more detail, the section 12 includes respective input lines 20 and 22 for hydrogen and feed oil respectively, with each of these divided into branch lines 20a-20d and 22a-22d. As shown, each of the branch lines is equipped with a valve. In the section 12, a plurality of segregated, two-phase streams 24, 26, 28, and 30 are formed by appropriate mixing of the corresponding branch lines 20a-20d and 22a-22d.

The heat exchanger section 14 is made up of a total of eight single-pass shell-and-tube heat exchangers 32-46, each having a tube inlet and a tube outlet as well as a shell inlet and a shell outlet. Moreover, it will be seen that the exchangers 32, 40; 34, 42; 36, 44; and 38, 46 are coupled in series relationship. The stream 24 is directed for passage in serial order through the tube sides of exchangers 32 and 40, while stream 26 passes through the tube sides of exchanger pair 34, 42, stream 28 through the tube sides of exchanger pair 36, 44 and stream 30 through the tube sides of exchanger pair 38, 46.

After preheating in the section 14, the respective streams 24-30 are passed, while still segregated, through a conventional fired furnace 16 to complete the heating thereof. At this point the streams 24 and 26 are combined to yield a combined stream 48, while the streams 28 and 30 are similarly combined to form combined stream 50. The streams 48 and 50 are in turn passed through the cracking reactors 52, 54 where the hydrocracking reaction takes place. The heated effluent from the reactors 52, 54 is passed through branched lines 56, 58 which pass through the shell sides of the heat exchangers 32-46 as shown. In this manner the heat generated in the furnace 16 and/or the reactors 52, 54 is recovered in the heat exchangers 32-46.

The Present Invention

Figure 2:
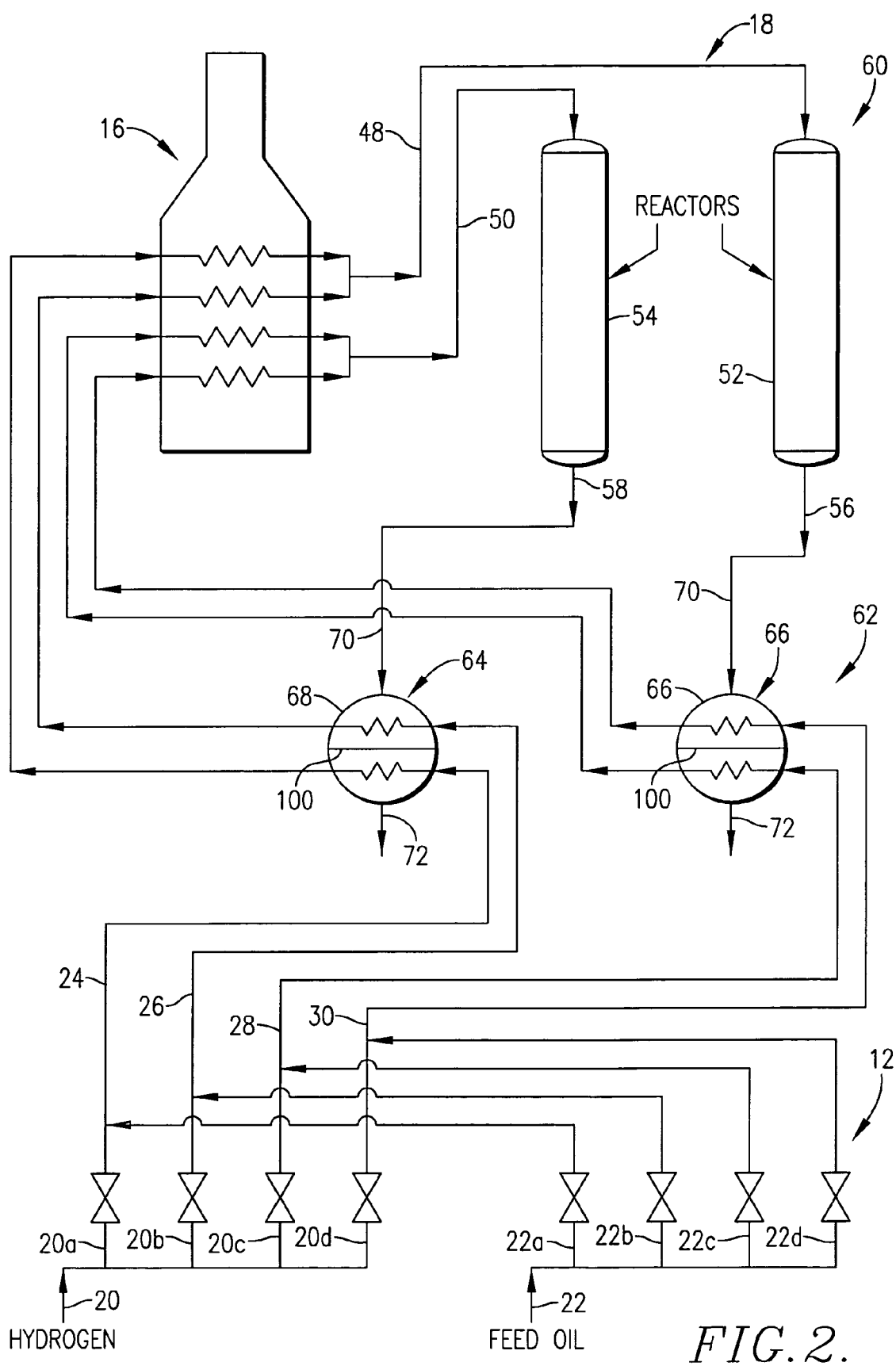
FIG. 2 is a schematic flow diagram similar to that of FIG. 1, illustrating the use of multiple-pass heat exchangers in accordance with the present invention.

Referring now to FIG. 2, an improved hydrocarbon processing system 60 is depicted. In some respects the system 60 has identical components as compared with system 10 of FIG. 1, and where applicable the same reference numerals are employed. Thus, the system 60 includes a mixing section 12, furnace 16, and reactor section 18 which are the same as those shown in the FIG. 1 illustration. However, the system 60 has an improved heat exchanger section 62 made up of two double pass heat exchangers 64, 66 in lieu of the eight heat exchangers 32-46 described above with reference to the prior art system, depicted in FIG. 1.

Each of the exchangers 64, 66 is identical, and attention is directed to FIGS. 3 and 4 which detail the preferred construction of these exchangers. Specifically, the exchanger 64 as shown includes a unitary shell 68 equipped with a shell inlet 70 and outlet 72. The exchanger also has a tube assembly 74 comprising an apertured plate 76 supporting a total of eight U-tube pairs 78, 80, 82, 84, 86, 88, 90, and 92 which extend into shell 68. A divider plate 94 is also affixed to plate 76 and forces the heating medium passing through the shell 68 to follow a tortuous path from inlet 70 to outlet 72.

The overall exchanger 64 also has a header section 96 which includes an extension of the shell wall 68, an outer wall 98, and three inner divider walls 100, 102, and 104. Thus, the wall 100 separates the header into first and second header zones 100a and 100b. Moreover, the spaced divider walls 102, 104 divide each of the zones 100a and 100b into initial, intermediate, and final sections S1, S2, and S3.

Referring to FIG. 3, it will be seen that the U-tube pairs 78, 80 and 86, 88, bridge divider wall 104, thus communicating sections S1 and S2 on each side of divider wall 100; similarly, the U-tube pairs 82, 84 and 90, 92 bridge divider wall 102, thus communicating sections S2 and S3 on each side of divider wall 100.

Again referring to FIG. 3, it will be seen that the exchanger 64 has a pair of tube inlets 106, 108 and corresponding tube outlets 110, 112, with inlet 106 and outlet 110 serving one side of the exchanger whereas pair 108, 112 serves the other side thereof. More specifically, the inlet 106 communicates with initial section S1 of zone 100a whereas outlet 110 communicates with final section S3 of zone 100a. Similarly, inlet 26 communicates with initial section S1 of zone 100b, while outlet 112 communicates with final section S3 of zone 100b.

In the operation of exchanger 64, the respective streams 24 and 26 pass through inlets 106 and 108 and are segregated within the zones 100a and 100b. Additionally, the streams 24 and 26 are passed in serial order through the initial, intermediate, and final sections S1, S2, and S3 of each zone 100a, 100b, whereupon the heated streams 24 and 26 are outputted through the outlets 110 and 112. Of course, when the streams 24 and 26 pass through the U-tube assemblies within shell 68 they are heated.

Thus, it will be appreciated that the exchanger 64 is a tube-side dual-pass exchanger in the sense that two respective streams 24 and 26 of fluid to be heated are simultaneously received and heated in the tube sides of the exchanger, while the streams remain fully segregated from each other. Returning now to FIG. 2, it will be seen that the hot reactor effluent in lines 56, 58 passes through the shell side of the exchanger 64, 66 for heat recovery purposes.

It will thus be seen that the heat exchanger apparatus of the present invention significantly lessens the complexity of a typical hydrocarbon processing method by the use of a single indirect heat exchanger simultaneously receiving respective hydrogen/hydrocarbon streams while maintaining the separation thereof during heating. By the same token, there is a substantial reduction in piping and pump requirements, with more simplified controls. This means that an equivalent processing system has materially reduced capital costs as well as lowered ongoing maintenance expenses.

The preferred forms of the invention described above are to be used as illustration only, and should not be utilized in a limiting sense interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope fo the present invention as pertains to any apparatus not materially departing from but outside the literal scope of the invention as set forth in the following claims.

What is claimed is:

1. A hydrocarbon processing method comprising:
   (a) simultaneously heating at least two hydrocarbon-containing streams in a first side of an indirect heat exchanger while maintaining separation of said hydrocarbon-containing streams in said heat exchanger;
   (b) subjecting the resulting heated streams to chemical reaction in a reactor;
   (c) passing a hot effluent stream from said reactor through a second side of said heat exchanger to thereby facilitate the heating of step (a); and
   (d) combining a first gaseous hydrogen stream and a first liquid hydrocarbon stream to thereby form one of said hydrocarbon-containing streams and combining a second gaseous hydrogen stream and a second liquid hydrocarbon stream to thereby form another of said hydrocarbon-containing streams.

2. A hydrocarbon processing method comprising:
   (a) simultaneously heating at least two hydrocarbon-containing streams in a first side of an indirect heat exchanger while maintaining separation of said hydrocarbon-containing streams in said heat exchanger;
   (b) subjecting the resulting heated streams to chemical reaction in a reactor;
   (c) passing a hot effluent stream from said reactor through a second side of said heat exchanger to thereby facilitate the heating of step (a);
   (d) further heating in a furnace the heated hydrocarbon-containing steams exiting said heat exchanger; and
   (e) combining the further heated hydrocarbon-containing streams exiting said furnace prior to introduction into said reactor.

3. A hydrocarbon processing method comprising:
   (a) simultaneously heating at least two hydrocarbon-containing streams in a first side of an indirect heat exchanger while maintaining separation of said hydrocarbon-containing streams in said heat exchanger;

(b) subjecting the resulting heated streams to chemical reaction in a reactor; and (c) passing a hot effluent stream from said reactor through a second side of said heat exchanger to thereby facilitate the heating of step (a), wherein said indirect heat exchanger is a shell-and-tube heat exchanger, wherein said first side is the tube side and said second side is the shell side.

4. The hydrocarbon processing method of claim 3, wherein the tube side of said heat exchanger is at least partly defined by a plurality of open-ended U-tubes and a header, wherein said header defines first and second header zones that are fluidly isolated from one another, wherein said U-tubes include a first group of U-tubes fluidly communicating with said first header zone and a second group of U-tubes fluidly communicating with said second header zone.

5. The hydrocarbon processing method of claim 4, wherein said heat exchanger defines a shell-side inlet for receiving said reactor effluent and a shell-side outlet for discharging said reactor effluent, wherein said heat exchanger comprises a divider plate disposed between said first and second groups of U-tubes, wherein said divider plate forces said reactor effluent to traverse a tortous flow path from said shell-side inlet to said shell-side outlet.

6. The hydrocarbon processing method of claim 4, wherein said first and second header zones include respective first and second initial, intermediate, and final sections, wherein said first initial, intermediate, and final sections can fluidly communicate with one another only through said first group of U-tubes, wherein said second initial, intermediate, and final sections can fluidly communicate with one another only through said second group of U-tubes.

7. The hydrocarbon processing method of claim 6, wherein said first and second groups of U-tubes comprise respective first and second initial and final U-tubes, wherein said first initial U-tubes provide fluid communication between said first initial and intermediate sections, wherein said first final U-tubes provide fluid communication between said first intermediate and final sections, wherein said second initial U-tubes provide fluid communication between said second initial and intermediate sections, wherein said second final U-tubes provide fluid communication between said second intermediate and final sections.

8. The hydrocarbon processing method of claim 7, wherein said heat exchanger defines first and second tube-side inlets and outlets, wherein said first tube-side inlet fluidly communicates directly with said first initial section, wherein said second tube-side inlet fluidly communicates directly with said second initial section, wherein said first tube-side outlet fluidly communicates directly with said first final section, wherein said second tube-side outlet fluidly communicates directly with said second final section.

9. A hydroprocessing unit comprising:

a shell-and-tube heat exchanger defining a shell-side flow path configured to receive a shell-side fluid and at least two separate tube-side flow paths configured to receive and maintain separation of at least two tube-side fluids; and a reactor defining an inlet configured to receive said tube-side fluids from said tube-side flow paths and an outlet configured to discharge a reactor effluent therefrom, wherein said shell-side flow path is fluidly coupled to said reactor outlet so that said reactor effluent can be employed as said shell-side fluid in said heat exchanger.

10. The hydroprocessing unit of claim 9 further comprising, a furnace configured to receive said tube-side fluids from said tube-side flow paths, wherein said reactor is configured to receive said tube-side fluids from said furnace.

11. The hydroprocessing unit of claim 9, wherein said tube-side flow paths are at least partly defined by a plurality of open-ended U-tubes and a header, wherein said header defines first and second header zones that are fluidly isolated from one another, wherein said U-tubes include a first group of U-tubes fluidly communicating with said first header zone and a second group of U-tubes fluidly communicating with said second header zone.

12. The hydroprocessing unit of claim 11, wherein said shell-side flow path includes a shell-side inlet configured to receive said shell-side fluid and a shell-side outlet configured to discharge said shell-side fluid, wherein said heat exchanger comprises a divider plate disposed between said first and second groups of U-tubes, wherein said divider plate is configured to force said shell side fluid to traverse a tortous flow path from said shell-side inlet to said shell-side outlet.

13. The hydroprocessing unit of claim 11, wherein said first and second header zones include respective first and second initial, intermediate, and final sections, wherein said first initial, intermediate, and final sections are configured to fluidly communicate with one another only through said first group of U-tubes, wherein said second initial, intermediate, and final sections are configured to fluidly communicate with one another only through said second group of U-tubes.

14. The hydroprocessing unit of claim 13, wherein said first and second groups of U-tubes comprise respective first and second initial and final U-tubes, wherein said first initial U-tubes are configured to provide fluid communication between said first initial and intermediate sections, wherein said first final U-tubes are configured to provide fluid communication between said first intermediate and final sections, wherein said second initial U-tubes are configured to provide fluid communication between said second initial and intermediate sections, wherein said second final U-tubes are configured to provide fluid communication between said second intermediate and final sections.

15. The hydroprocessing unit of claim 14, wherein said heat exchanger defines first and second tube-side inlets and outlets, wherein said first tube-side inlet fluidly communicates directly with said first initial section, wherein said second tube-side inlet fluidly communicates directly with said second initial section, wherein said first tube-side outlet fluidly communicates directly with said first final section, wherein said second tube-side outlet fluidly communicates directly with said second final section.

16. A shell-and-tube heat exchanger for facilitating simultaneous indirect heat transfer between a shell-side fluid stream and at least two separate tube-side fluid streams, said heat exchanger comprising:

a shell;

a single header; and a plurality of U-tubes coupled to said single header and at least partly disposed in said shell, wherein said single header and said U-tubes cooperatively define at least a portion of two separate tube-side flow paths configured to receive and maintain separation of said tube-side fluid streams.

17. The heat exchanger of claim 16, wherein said single header defines first and second header zones that are fluidly isolated from one another, wherein said U-tubes include a first group of U-tubes fluidly communicating with said first header zone and a second group of U-tubes fluidly communicating with said second header zone.

18. The heat exchanger of claim 17, wherein said shell defines a shell-side inlet for receiving said shell-side fluid stream and a shell-side outlet for discharging said shell-side fluid stream, wherein said heat exchanger further comprises a divider plate disposed in the shell between said first and second groups of U-tubes, wherein said divider plate is configured to force said shell-side fluid stream to traverse a tortous flow path from said shell-side inlet to said shell-side outlet.

19. The heat exchanger of claim 17, wherein said first and second header zones include respective first and second initial, intermediate, and final sections, wherein said first initial, intermediate, and final sections are configured to fluidly communicate with one another only through said first group of U-tubes, wherein said second initial, intermediate, and final sections are configured to fluidly communicate with one another only through said second group of U-tubes.

20. The heat exchanger of claim 19, wherein said first and second groups of U-tubes comprise respective first and second initial and final U-tubes, wherein said first initial U-tubes are configured to provide fluid communication between said first initial and intermediate sections, wherein said first final U-tubes are configured to provide fluid communication between said first intermediate and final sections, wherein said second initial U-tubes are configured to provide fluid communication between said second initial and intermediate sections, wherein said second final U-tubes are configured to provide fluid communication between said second intermediate and final sections.

21. The heat exchanger of claim 20, wherein said heat exchanger defines first and second tube-side inlets and outlets, wherein said first tube-side inlet fluidly communicates directly with said first initial section, wherein said second tube-side inlet fluidly communicates directly with said second initial section, wherein said first tube-side outlet fluidly communicates directly with said first final section, wherein said second tube-side outlet fluidly communicates directly with said second final section.

* * * * *